Aug. 16, 1938.　　　　W. L. WRIGHT　　　　2,127,197
CAMERA
Filed Nov. 26, 1934　　　2 Sheets-Sheet 1
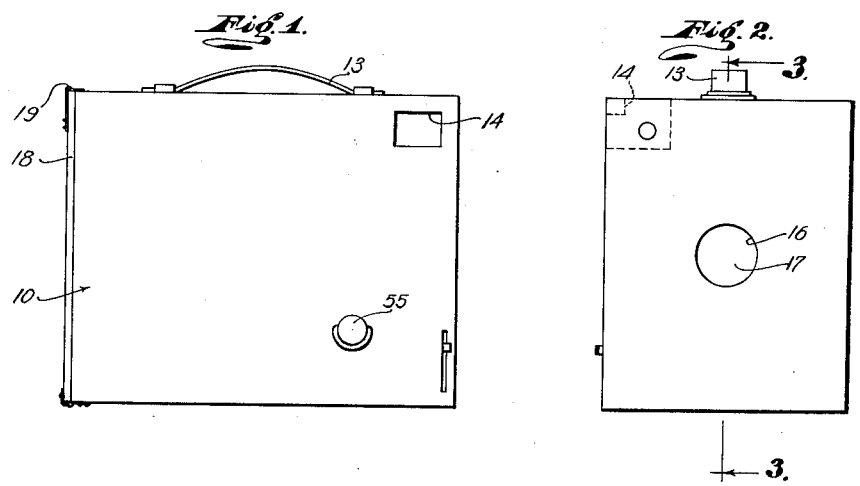
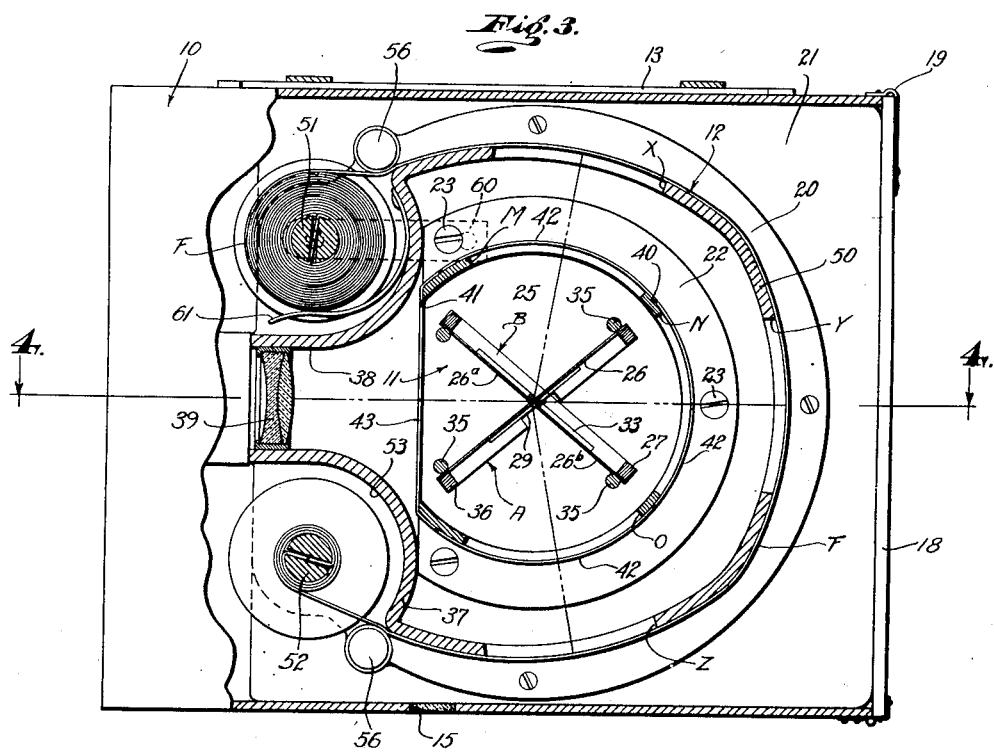
Inventor
WALTER L. WRIGHT
By
His Attorney Aug. 16, 1938.    W. L. WRIGHT    2,127,197
CAMERA
Filed Nov. 26, 1934    2 Sheets-Sheet 2
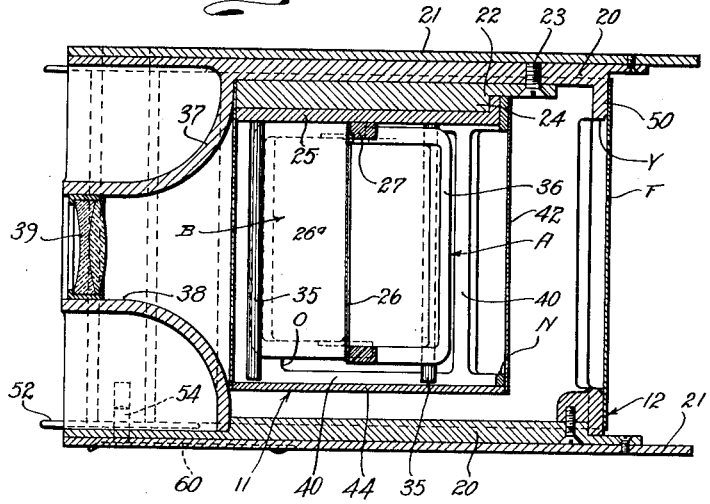
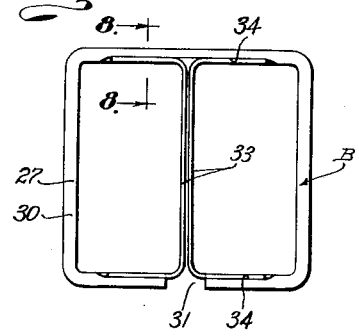
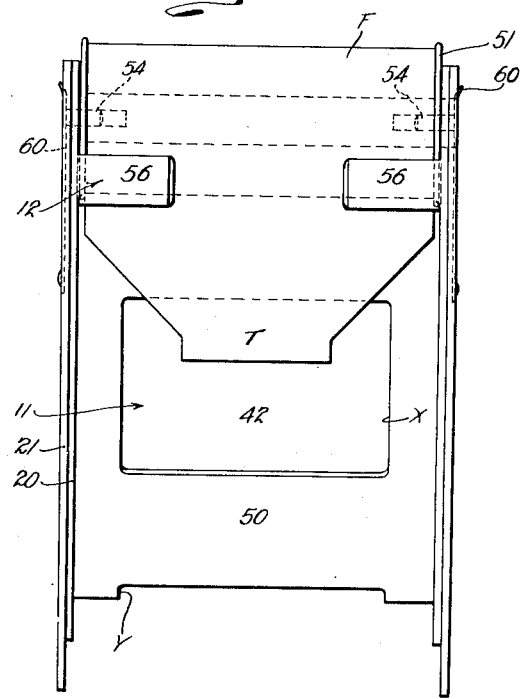
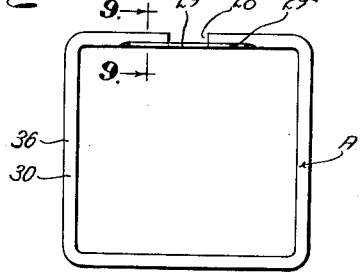
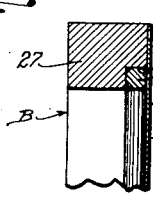
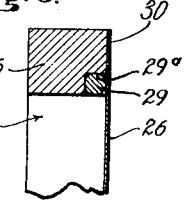
Inventor
WALTER L. WRIGHT
By
W H Caswell
His Attorney Patented Aug. 16, 1938

2,127,197

UNITED STATES PATENT OFFICE 2,127,197

CAMERA

Walter L. Wright, Santa Monica, Calif., assignor to Synchrome Corporation, Santa Monica, Calif., a corporation of California Application November 26, 1934, Serial No. 754,763

7 Claims. (Cl. 95—2)

This invention has to do with photography and has particular reference to cameras useful in the production of multicolor or natural color photographic reproductions or pictures. A general object of this invention is to provide a simple, practical and inexpensive camera that is adapted to employ commercial roll film and that is operable to simultaneously take a plurality of pictures or color records of a single object from a single point of vision, said pictures or records being of different chromatic values suitable for natural color reproductions. The camera of the present invention is adapted to be employed in the production of multicolor pictures in accordance with the method set forth and claimed in United States Letters Patent No. 1,890,764, granted to me December 13, 1932, and in the production of film of the character described and claimed in United States Letters Patent No. 1,857,578 granted to me May 10, 1932, except that the particular embodiment herein described is intended for the production of still pictures.

In making a plurality of negatives of different chromatic values simultaneously from a single point of vision it is necessary to employ a light dividing means in the camera. Heretofore prisms or glass plates have been used in cameras as light dividing elements. Prisms and glass plates are expensive and considerable light is lost where they are employed as light dividers. When glass plates are used as light dividing elements it becomes necessary to provide means to correct the distortion caused by the refraction of the light transmitted by the plates and to provide means for eliminating the double images resulting from the reflection of light from the opposite surfaces of the plates.

One of the objects of this invention is to provide a practical and very inexpensive light dividing means that does not necessitate the provision of means for compensating for the refraction of light.

Another object of the invention is to provide a light dividing and color filter unit for a camera that is removable and that is so inexpensive that its replacement as a whole or unit is not prohibitive.

Another object of the invention is to provide an optical system for a camera comprising light dividing elements of very thin transparent material whereby there is no visible double image or appreciable refraction.

Another object of the invention is to provide a light dividing and color filter unit for a camera that does not require adjustment because of temperature or atmospheric changes or because of rough handling of the camera.

Another object of the invention is to provide a light dividing and color filter unit for a camera in which replacements may be easily and quickly made without special tools or equipment.

Another object of the invention is to provide an optical unit of the character mentioned in which the light dividing means is fully protected against moisture and accumulations of dust, etc.

Another object of the invention is to provide an optical unit of the character mentioned that is adapted for use in a motion picture camera.

Another object of the invention is to provide an optical system of the character mentioned that includes color filters of thin celluloid, gelatin or the like, that are maintained in a curved condition so that they do not warp or wrinkle to any appreciable extent.

Another object of the invention is to provide a camera of the character mentioned in which the film may be easily and properly threaded into position for exposure and which does not involve film engaging pressure plates or like parts at the exposure apertures.

A further object of the invention is to provide a camera of the character mentioned that is operable to take or photograph a plurality of small negatives that are sufficiently accurate that enlargements in the color reproductions correspond in size.

The various objects and features of my invention will be fully understood from the following detailed description of a typical preferred form and application of the invention, throughout which description reference is made to the accompanying drawings, in which:

Fig. 1 is a side elevation of a camera embodying the present invention. Fig. 2 is a front elevation of the camera. Fig. 3 is an enlarged vertical detailed sectional view taken substantially as indicated by line 3—3 on Fig. 2 illustrating the details of the optical system and film guiding unit. Fig. 4 is a transverse or horizontal detailed sectional view of the optical system and film guide unit removed from the case taken substantially as indicated by line 4—4 on Fig. 3. Fig. 5 is a top or plan view of the optical system and film guiding unit removed from the case illustrating the manner of threading or training the film about the guide. Fig. 6 is the face or front elevation of one of the frames of one of the reflectors. Fig. 7 is a front elevation of the frame of the other reflector. Fig. 8 is an enlarged fragmentary vertical sectional view taken substantially as indicated by line 8—8 on Fig. 6 illustrating the transparent material of the reflector secured to the frame and Fig. 9 is an enlarged fragmentary vertical sectional view taken as indicated by line 9—9 on Fig. 7 illustrating the transparent and light reflecting material secured to the frame.

The camera provided by the present invention includes, generally, a case 10 and a removable assembly in the case comprising a light dividing and filtering unit 11 and a film guiding and advancing means 12.

The case 10 may be varied considerably without departing from the invention. The particular case 10 illustrated in the drawings is a simple, hollow, rectangular structure of the character commonly employed in box cameras. In accordance with the invention the case 10 may be proportioned to be readily carried from place to place by the user or photographer and a suitable handle 13 is provided on the top of the case. The case 10 has glassed view finder openings 14 and an opening 15 for determining the extent of advancement of the film. A centrally located light admitting opening 16 is provided in the front of the case 10. A manually controllable shutter 17 governs the admission of light into the case through the opening 16. The invention is not concerned with the type of shutter or shutter operating means employed and the details of these structures have been omitted from the drawings as they are well known to those skilled in the art. The rear wall or back 18 of the case 10 may be hinged or removable to allow for the ready insertion and withdrawal of the internal assembly. A suitable lock or latch 19 is provided for holding the back 18 closed.

The internal assembly comprising the light dividing and filtering unit 11 and the film guiding means 12 is preferably arranged or mounted in the case 10 so that it may be easily and quickly removed therefrom for the purpose of threading in or replacing the film F and for the purpose of replacing the unit 11 or its parts. The internal removable assembly of the camera includes two spaced carriers or plates 20. Plate-like guides 21 are provided on the outer sides of the plates 20 to slidably fit the inner surfaces of the case 10 to position and support the assembly in the case. The carrier plates or base plates 20 are parallel and may be substantially rectangular as illustrated in the drawings.

The light dividing and filtering unit 11 includes a flange-like carrier or base 22 removably attached to a plate 20 as by screws 23 or the like. The base 22 may be substantially disc shaped and may have a concentric or central inwardly projecting boss 24. A substantially disc shaped plate 25 may be arranged on the boss 24 and may have a flange engaging the periphery of the boss 24. The plate 25 supports or carries two light dividers or reflectors A and B of the unit 11. In accordance with the invention the reflectors A and B comprise very thin sheets or plates 26 of transparent material. The light dividers or reflectors A and B are in crossed relation to intercept the light entering the camera.

It has been found practical to make the sheets or plates 26 of the reflectors A and B of gelatin, collodion or Celluloid or certain combinations of the same. It may be preferred to form the sheets or plates 26 of Celluloid as this material is less sensitive to atmospheric conditions than gelatin. The sheets or plates 26 of the reflectors A and B are preferably clear transparent members. However, it is to be understood that the reflector plates 26 may be colored to act as color filters as well as reflectors. When formed of gelatin the sheets or plates 26 of the reflectors may have protective coatings of Celluloid, lacquer or the like to protect them against atmospheric conditions, finger prints, dust, etc. In accordance with the invention the light reflecting and transmitting sheets or plates 26 are from .001″ to .002″ in thickness so that there is practically no refraction of the transmitted light and no visible second or double reflected image because the images reflected from the front and rear surfaces are so closely coincide that they are not separately visible. The glass plate reflectors heretofore employed as light dividers in similar situations, owing to their thickness, caused the images reflected from their rear and front surfaces to be offset a substantial amount, which produced double images making it necessary to employ transparent plates having colors complementary to the respective filters to absorb the rear surface reflections. The light reflecting and transmitting sheets or plates 26 of the reflectors A and B in being very thin simplify the camera and make it inexpensive and particularly effective.

The unit 11 includes improved and particularly effective means for carrying or mounting the sheets or plates 26 of the reflectors A and B. While each light dividing element or reflector A and B may be in two sections I have found it advantageous to make the transparent sheet or plate 26 of one reflector integral or one-piece and make the transparent plate 26 of the other reflector of two sections. In the particular case illustrated in the drawings the plate 26 of the reflector A comprises one continuous unit or section while the plate 26 of the reflector B comprises two sections 26$^a$ and 26$^b$. The reflector A includes a frame 36 to carry its transparent sheet or plate 26 while the reflector B includes a frame 27 for supporting its two sheets or plates 26. The frames 36 and 27 may be formed of Bakelite or aluminum to be light in weight or may be formed of brass or other suitable metal. In the preferred construction the frames 36 and 27 are substantially square or rectangular in outline, the two reflectors A and B being of substantially the same size. The frame 36 of the reflector A extends substantially the entire distance around the edge portion of the transparent sheet or plate 26. A space or gap 28 occurs between the opposite ends of the piece of material comprising the frame 36. The gap 28 is preferably in the upper end of the frame and is equally spaced between its opposite vertical side parts. A pin or wire 29 of relatively small diameter is secured in grooves 29$^a$ in inner corners of the opposite end portions of the member forming the frame 36 and extends across the gap 28 to connect the said end portions. One side surface 30 of the frame 36 is accurately machined or finished to receive or carry the transparent sheet or plate 26. The wire 29 has a surface substantially flush with the said surface 30.

The frame 27 of the reflector B extends along the top and side edge portions of the sections 26$^a$ and 26$^b$ of the transparent sheet 26 comprising the reflector B. The frame 27 extends inwardly along the lower edges of the sections 26$^a$ and 26$^b$ and a space or gap 31 occurs between the ends of the piece of material forming the frame. The frame 27 has a side surface 30 to which the sections 26$^a$ and 26$^b$ are secured. The gap 31 is preferably equally spaced between the opposite vertical extremities of the frame. The opposing inner edges of the transparent reflector sections 26ᵃ and 26ᵇ are spaced a short distance apart leaving a slot which is equally spaced between the opposite side extremities of the reflector. Wires 33 of small diameter extend along the adjacent opposing edge portions of the two transparent sections 26ᵃ and 26ᵇ to support the inner edge portions of the sections against sagging, wrinkling, etc. The opposite end portions of the wires 33 are secured in notches or grooves 34 in inner corners of the upper and lower portions of the frame 27. The wires 33 are spaced a short distance apart whereby the wire 29 and the transparent sheet 26 of the reflector A may be received between them when the reflectors are assembled in crossed relation by moving the reflector B downwardly over the reflector A to a position where the upper and lower parts of the frames 36 and 27 are in substantially the same planes. The transparent sheets or plates 26 of the reflectors A and B are cemented or joined to the surfaces 30 and the wires 29 and 33 of the frames 36 and 27 so that they are maintained under a proper strain or tautness.

The light dividing elements or reflectors A and B formed and assembled as described above are definitely or accurately secured in position on the plate 25. Four spaced studs or posts 35 project inwardly from the plate 25. The outer portions or arms of the frames 36 and 27 are brought into engagement with the posts 25 and cemented thereto without the application of force or pressure. The frames 36 and 27 are thus accurately positioned on the plate 25 and secured thereto in a manner so that they may be quite readily removed. In accordance with the invention the crossed reflectors A and B are disposed directly in the path of light admitted by the opening 16. One of the plates 20 has a mask apron or wall 37 projecting toward the other plate 20 which is provided with a central opening 38. The opening 38 is directly aligned with the opening 16 and passes the light inwardly to the crossed reflectors A and B. The wall 37 is preferably curved inwardly and forwardly to the opening 38 so that the opening is of considerable length and flares inwardly. The optical system of the camera includes a suitable lens 39. I have shown the lens 39 arranged in the outer portion of the opening 38. It is to be understood that the lens of the camera may be mounted in other manners either in front or at the rear of the shutter 17 and may be either fixed or adjustable.

The light dividing elements or reflectors A and B cross where they intersect the axis of the optical system. The reflectors A and B pass or transmit a certain amount of light from the opening 38 directly inwardly. The reflector A reflects a portion of the light laterally in one direction while the reflector B reflects a portion of the light laterally in substantially the opposite direction. It is important that the reflecting surfaces of the reflectors A and B be disposed at less than 90° with relation to one another substantially as illustrated in Fig. 3 of the drawings. When the reflectors A and B are related in this manner they reflect more light than they would if they were disposed at 90° with relation to one another. When crossed reflectors are disposed at 90° they transmit more light than they reflect so that the transmitted image receives more light than the reflected images thus necessitating the provision of platinum or other reflecting material on the reflectors. With the reflectors A and B positioned as illustrated in the drawings it is usually unnecessary to provide them with reflecting material.

Further, with the arrangement illustrated and described there is less light lost by being reflected from one reflector to the other because such reflected light strikes the reflectors at a less acute angle and more of it is transmitted by the reflectors.

The light dividing and filtering unit 11 includes an apertured wall 40 substantially surrounding the crossed reflectors A and B. The wall 40 projects inwardly from the base 22 and may be in the nature of a substantially tubular member surrounding and suitably secured to the peripheral flange of the plate 25. The wall 40 is preferably cylindrically or concentrically curved about the point of intersection of the reflectors A and B. A light passing opening 41 is provided in the front of the wall 40 in direct alignment with the opening 38 to admit or pass the light inwardly to the reflectors A and B. Three circumferentially spaced apertures M, N and O are provided in the curved wall 40. The aperture M is in the path of the light reflected by the reflector A, the aperture N is in the path of the light transmitted by the crossed reflectors A and B and the aperture O is in the path of the light reflected by the reflector B.

While the reflectors A and B may be suitably colored as suggested above, it is preferred to provide light filters 42 at the apertures M, N and O. The filters 42 may be attached to the inner surface or the outer surface of the wall 40 and extend completely across the apertures M, N and O. The filters 42 are preferably comparatively thin and formed of gelatin or the like. It is preferred to cement or otherwise secure the filters 42 to the wall 40 in a manner so that they are curved substantially concentric with the wall and are thus prevented from wrinkling or buckling. In accordance with the broader aspects of the invention the light filters 42 may be of various color combinations as required. I have found it preferable to provide a violet filter 42 at the aperture M, a green filter 42 at the aperture N, and an orange filter 42 at the aperture O. In most instances the image transmitted by the crossed reflectors A and B should be of the color requiring the most exposure, it being understood that a change in the location or position of the filters 42 operates to change the position of the respective color negatives. It is to be noted that the color filters 42 fully close and seal the apertures M, N and O against the entrance of dust, etc.

It is a feature of the invention that the unit 11 is sealed to protect the reflectors A and B against moisture, dust, etc. A clear transparent plate 43 of glass, or the like, extends across and closes the light admitting opening 41 in the front of the wall 40. The outer or open end of the tubular wall 40 is closed and sealed by a cover 44 of glass or metal. It will be apparent that where the several openings and apertures in the wall 40 are closed and sealed as described, the crossed reflectors A and B are fully protected against dust, etc.

The film guiding and advancing means 12 is adapted to handle the typical or common forms of roll film now on the market. The means 12 includes a film guide 50 curved about the point of intersection of the crossed reflectors A and B. The guide 50 is spaced outwardly from the wall 40 and may be a continuation of the front wall 37. In the particular structure illustrated in the drawings the guide 50 is integral with the wall 37 and the plate 20 carrying the wall 37. Three circumferentially spaced apertures X, Y and Z are provided in the guide 50. The apertures X, Y and Z are spaced one from the other a distance slightly greater than the space required for one picture, thus leaving gaps between the adjacent records on the film F. The apertures in the film guide 50 are in direct alignment with the apertures of the wall 40, that is the aperture X is aligned with the aperture M to expose the film F to the light reflected by the reflector A, the aperture Y is aligned with the aperture N to expose the film F to the light transmitted by the reflectors A and B and the aperture Z is aligned with the aperture O to expose the film F to the light reflected by the reflector B. The outer surface of the guide 50 supports and guides the film F and is properly finished for this purpose. In some instances the film guide 50 may be concentrically curved about the point of intersection of the reflectors A and B. However, where a lens of large aperture is employed it is preferred to make the film guiding surfaces of the guide 50 adjacent the apertures X, Y and Z, of a greater radii of curvature as illustrated in the drawings.

The film F is trained around the guide 50 so that three picture areas are simultaneously exposed upon the opening of the shutter 17. The supply roll of film F may be arranged on a spool 51 and is adapted to be reeled upon a spool 52. Recesses 53 are provided in the front wall 37 to receive or partially receive the spools 51 and 52. Trunnions or pins 54 on leaf springs 60 extend into openings in the ends of the spools 51 and 52 to support the spools for rotation. A winding key 55 is provided at the exterior of the case 10 for rotating the spool 52 to take or reel up the film F. The usual ratchet means (not shown) may be provided in connection with the take-up key 55 to prevent reverse rotation of the spool 52. A spring 61 may be provided to engage the roll of the film to exert a frictional drag and prevent undesirable looseness of the spools and film F.

The invention provides simple means for maintaining the film in proper engagement with the outer surface of the guide 50. Studs 56 project inwardly toward one another from the spaced plates 20 adjacent the opposite ends of the guide 50. The studs 56 are spaced short distances from the ends of the guide 50 so that the film may be trained between them and the guide. The studs 56 are located so that they retain the film in proper engagement with the guide 50. If found desirable the guide studs 56 may be provided with rotatable sleeves or rollers. In accordance with the invention the opposite or opposing ends of the studs 56 are spaced a considerable distance apart so that the tab T at the end of the film may be easily drawn or fed between them and the guide 50. Fig. 5 of the drawings illustrates the manner in which the film F may be readily threaded under the studs 56.

Upon opening the back 18 of the case 10 the internal assembly may be easily withdrawn from the case for the purpose of training the film F over the guide 50 and arranging it so that it may be reeled upon the spool 52. It will be understood how the light dividing and filtering unit 11 or any of its parts may be replaced when the assembly is removed from the case 10. When the parts are properly arranged and assembled in the positions illustrated in Fig. 3 of the drawings the camera is in condition for operation. Opening of the shutter 17 of course admits light into the camera to be transmitted and reflected by the crossed reflectors A and B. A portion of the incoming light is transmitted through the reflectors A and B to fall on the film exposed at the aperture Y. A portion of the light is reflected by the reflector A to fall on the portion of the film exposed at the aperture X while a portion of the light is reflected by the reflector B to fall on the film exposed at the aperture Z. In this manner three spaced portions or picture areas of the film are simultaneously exposed to light from a single source or angle. The three exposures are of different chromatic values depending upon the character of the light filters 42.

As previously pointed out, the sheets or plates 26 of the reflectors A and B are very thin so that they do not cause any appreciable refraction of the transmitted light and do not produce sufficient double reflections or double images to necessitate the coloring of the reflectors and the filtering out of the back reflected images and therefore all of the reflection from both the front and back surfaces is available thereby increasing the efficiency of the unit. The reflectors A and B are fully protected against dust, etc. and are arranged and mounted so that they may be easily and quickly replaced when necessary. Further, the reflectors A and B are very inexpensive of manufacture. The light filters 42 serve to seal the light passing apertures of the wall 40 as well as chromatically influence the light reflected and transmitted by the reflectors A and B. The filters 42 are simple, inexpensive members or elements and may be easily exchanged one for the other or replaced. The camera of the present invention embodies a light dividing optical system and film guiding and advancing unit that involves a minimum number of simple, inexpensive, parts.

Having described only a typical form and application of my invention, I do not wish to be limited or restricted to the specific form and application herein set forth, but wish to reserve to myself any modifications or variations that may appear to those skilled in the art or fall within the scope of the following claims.

Having described my invention, I claim:

1. In photographic apparatus, film guiding means comprising a curved part around which the film is adapted to be arranged, said part having picture apertures, light dividing means within said part, a wall around the light dividing means having apertures aligned with the apertures in said part, and light filters at the last mentioned apertures.

2. In photographic apparatus, film guiding means comprising a curved part around which the film is adapted to be arranged, said part having picture apertures, light dividing means within said part, a wall enclosing the light dividing means, the wall having apertures aligned with the first mentioned apertures, and light filters extending across and sealing the last mentioned apertures.

3. In photographic apparatus, film guiding means comprising a curved part around which the film is adapted to be arranged, said part having picture apertures, light dividing means within said part, a curved wall surrounding the light dividing means, the said wall having apertures aligned with the apertures in the said part, and light filters secured to said wall to extend across and seal the last mentioned openings.

4. In photographic apparatus, an optical system unit comprising, light dividing means, a curved wall enclosing said means, said wall having light apertures, and relatively thin light transmitting members secured to said wall to seal said apertures and curved substantially concentric with the wall whereby they are prevented from wrinkling and buckling, at least one of said members being colored to chromatically influence light.

5. In photographic apparatus, a carrier, a curved guide projecting from the carrier around which a film may be arranged, the guide having apertures, and a removable unit on the carrier within the guide, the unit including a light dividing means, a wall extending around the said means and having apertures aligned with the apertures of the guide, and light filters at the apertures.

6. In photographic apparatus, a carrier, a curved guide projecting from the carrier around which a film may be arranged, the guide having apertures, a base, means detachably securing the base to the carrier within the guide, light dividing means on the base, a wall on the base spaced between the guide and the light dividing means, there being apertures in the wall, and light filters at the apertures in the wall.

7. In photographic apparatus, an optical system unit comprising, a pair of crossed light dividing reflectors, a wall enclosing said means and having a part substantially curved about the point of intersection of the reflectors, there being spaced apertures in said part, and relatively thin light filters secured to said part of the wall to extend across its apertures and curved substantially concentric with said part whereby they are prevented from wrinkling and buckling.

WALTER L. WRIGHT.